United States Patent
Chen (10) Patent No.: US 10,312,796 B1
(45) Date of Patent: Jun. 4, 2019

(54) POWER SUPPLY SYSTEM AND POWER CONVERTER WITH START CIRCUIT FOR BOOST MODULES

(71) Applicant: Chicony Power Technology Co., Ltd., New Taipei (TW)

(72) Inventor: Huang-Ying Chen, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/120,466

(22) Filed: Sep. 4, 2018

(30) Foreign Application Priority Data

Jun. 15, 2018 (TW) ............................. 107120831 A (51) Int. Cl.
| H02M 1/36 | (2007.01) |
| H02M 1/32 | (2007.01) |
| H02M 1/08 | (2006.01) |
| H02M 3/155 | (2006.01) |
| H02M 7/06 | (2006.01) |
| H02M 1/00 | (2006.01) |

(52) U.S. Cl.
CPC ............. *H02M 1/32* (2013.01); *H02M 1/08* (2013.01); *H02M 1/36* (2013.01); *H02M 3/155* (2013.01); *H02M 7/06* (2013.01); *H02M 2001/009* (2013.01)

(58) Field of Classification Search
CPC ............. H02M 1/36; H02M 2001/008; H02M 2001/009; H02M 3/33561; H02M 3/1584
See application file for complete search history.

(56) References Cited

U.S. PATENT DOCUMENTS

| 9,219,420 | B1 | 12/2015 | Zhang et al. | |
| 2008/0080217 | A1* | 4/2008 | Takano | H02M 3/073 363/59 |
| 2009/0213629 | A1 | 8/2009 | Liu et al. | |
| 2010/0270985 | A1 | 10/2010 | Ko et al. | |
| 2018/0175727 | A1* | 6/2018 | Utsunomiya | H02H 7/1213 |

FOREIGN PATENT DOCUMENTS

| CN | 202841608 U | 3/2013 |
| CN | 204761319 U | 11/2015 |

* cited by examiner

*Primary Examiner* — Harry R Behm
(74) *Attorney, Agent, or Firm* — CKC & Partners Co., LLC (57) ABSTRACT

A power supply system includes multiple power converters. The output terminals of the power converters are coupled to each other. The power converter includes a rectifier unit, a first boost module, a start circuit, a second boost module, a first switch and a control unit. The control unit is electrically coupled to the rectifier unit, the first boost module and the first switch. After the second boost module receives the third voltage, a fourth voltage is delivered by the first switch from the second boost module to the first boost module. When the control unit receives the first voltage for a predetermined time, the control unit turns off the first switch and stops outputting the fourth voltage to the first boost module.

10 Claims, 6 Drawing Sheets

POWER SUPPLY SYSTEM AND POWER CONVERTER WITH START CIRCUIT FOR BOOST MODULES

RELATED APPLICATION

This application claims priority to Taiwan Application Serial Number 107120831, filed Jun. 15, 2018, which is herein incorporated by reference.

BACKGROUND

Technical Field

The present disclosure relates to a power supply system and a power converter. More particularly, the present disclosure relates to the power supply system and the power converter having a protecting function.

Description of Related Art

In the technology nowadays, the power supply system includes multiple power converters which may be connected in various ways and supply power to the load. However, due to the error around 5% existed in the output voltage of the power supply, it often happens that power converters in the power supply system supply power unevenly, which cause the abnormal output power occurs in some power converters.

When the output power of the power converter is abnormal, it may happen that the load inversely recharges the power via the output of the power converter, resulting errors in the feedback detection designed in the power converter, and causing the operations of the control chip (e.g., a microprocessor, or a central processing unit) or functional modules (e.g., a boost module) terminated. In this time, the starting circuit of the power converter endures a high voltage due to the continuous attempts to reactivate the control chip, which causes the components of the starting circuit (e.g., a resistor) burns out due to the unbearable high voltage.

SUMMARY

One aspect of the present disclosure is a power supply system. The power supply system includes a plurality of power converters, the output terminals of the plurality of power converters are coupled to each other. Any one of the converters includes a rectifier unit, a first boost module, a start circuit, second boost module, a first switch and a control unit. The rectifier unit is configured to generate a first voltage. The first boost module is electrically coupled to the rectifier unit and configured to generate a second voltage according to the first voltage. The start circuit is electrically coupled to the first boost module and configured to provide a third voltage according to the second voltage. The second boost module is electrically coupled to the start circuit, and configured to generate a fourth voltage according to the third voltage. The first switch is electrically coupled to the first boost module and the second boost module, and configured to selectively conduct the fourth voltage provided by the second boost module to the first boost module. The control unit is electrically coupled to the rectifier unit, the first boost module and the first switch. After the second boost module receives the third voltage, the fourth voltage is delivered via the first switch from the second boost module to the first boost module, on the condition that the control unit receives the first voltage for a predetermined time, the control unit is configured to turn off the first switch and stop outputting the fourth voltage to the first boost module.

Another aspect of the present disclosure is a power converter. The power converter includes a rectifier unit, a first boost module, a start circuit, a second boost module, a first switch and a control unit. The rectifier unit is configured to generate a first voltage. The first boost module is electrically coupled to the rectifier unit, and configured to generate a second voltage according to the first voltage. The start circuit is electrically coupled to the first boost module and configured to provide a third voltage according to the second voltage. The second boost module is electrically coupled to the start circuit and configured to generate a fourth voltage according to the third voltage. The first switch is electrically coupled to the first boost module and the second boost module, and configured to selectively conduct the fourth voltage provided by the second boost module to the first boost modules. The control unit is electrically coupled to the rectifier unit, the first boost module and the first switch. The second boost module outputs the fourth voltage to the first boost module via the first switch after the second boost module receives the third voltage, and the control unit is configured to turn off the first switch and stop outputting the fourth voltage to the first boost module on the condition that the control unit receives the first voltage for a predetermined time.

DETAILED DESCRIPTION

In order to make the description of the present disclosure more detailed and comprehensive, reference will be made in detail to the accompanying drawings and the following embodiments. However, the provided embodiments are not used to limit the ranges covered by the present disclosure; orders of step description are not used to limit the execution sequence either. Any devices with equivalent effect through rearrangement are also covered by the present disclosure. In addition, according to industry standards and conventions, the drawings are only for the purpose of assisting specification, and are not drawn in accordance with the original dimensions. In fact, the dimensions of various features may be arbitrarily increased or decreased for ease of description. The same components in the following description will be designated by the same symbols to facilitate understanding.

Figure 1:
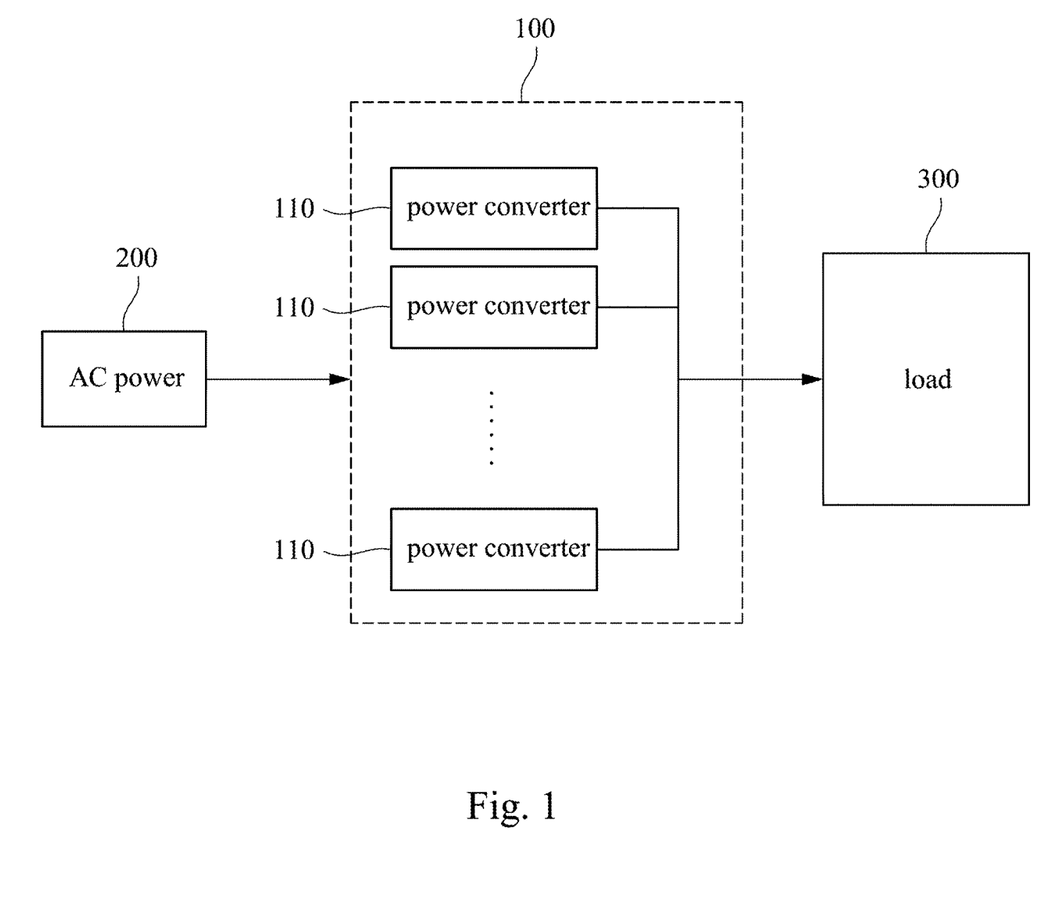
FIG. 1 is an architecture diagram of a power supply system.

FIG. 1 shows a block diagram of the power supply system 100 according to some embodiments of the present disclosure, the power supply system 100 includes a plurality of power converters 110, the output terminals of power converters 110 are coupled to each other, and simultaneously output power to the load 300. When the input power required for the load operation reaches the maximum rating, the power converter 110 outputs power at rated maximum power to the load 300. Because in the power supply system 100, each power converter 110 has its own maximum output rating, therefore, each power converter 110 is output to the load 300 with its own maximum rated power.

On the condition that the power supply system 100 is used to supply power to the load 300, because the output voltage supplied by the power converter 110 has an error of ±5% in the general design. In general application, the internal of the power converter 110 includes start device and boost module. The boost module and other functional modules include control chips (such as a central processing unit, microprocessor or power integrated circuit). The voltages output from the plurality of power converters 110 in the power supply system 100 are not necessarily the same due to errors in their design. There may be a partial lower limit on the output voltage of the power converter 110 (e.g. biased toward −5%), another part of the output voltage of the power converter 110 is biased toward the upper limit (e.g. biased toward +5%), in this way, the terminal of load 300 output (e.g., from the other power converter 110 which output voltage biased toward upper limit) will recharge voltage to the power converter 110 which output voltage biased toward lower limit, causing the control chip of the inner part of functional module (e.g. boost module) of the power converter 110 which output voltage biased toward lower limit does not work properly. When the control chip of the power converter 110 does not work properly, the control chip will continuously extract power via start device, such that start device bears high pressure and burns. The description of the start device protects the power converter 110 of the present disclosure will be further described below in detail.

Figure 2:
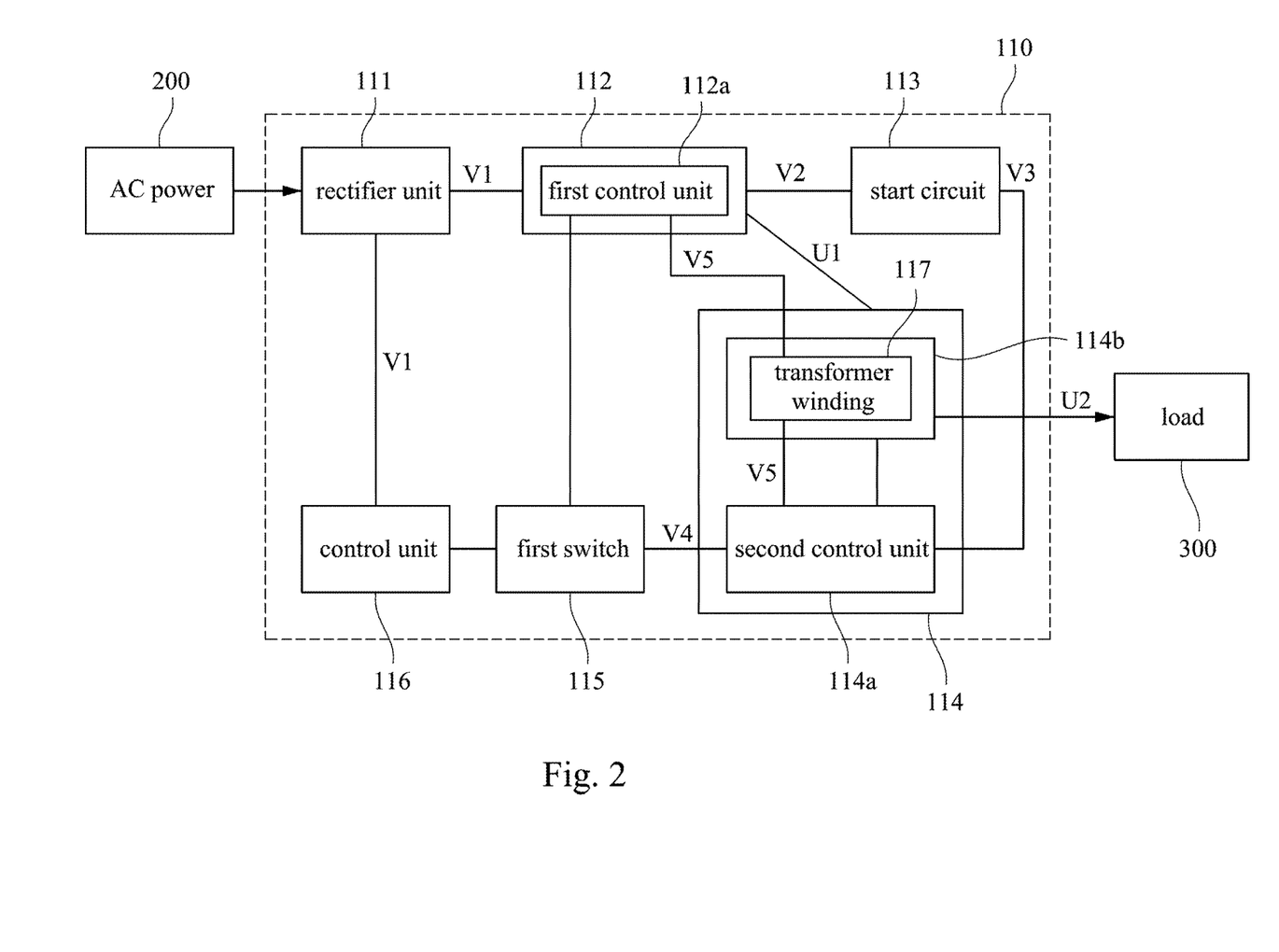
FIG. 2 is a function block diagram of a power converter according to an embodiment of the present disclosure.

FIG. 2 shows a function block diagram according to one of the power converters 110 in the power supply system 100 shown in FIG. 1 of the present disclosure. The power supply system 100 includes a plurality of power converters, the output terminals of the plurality of power converters are electrically coupled to each other, and one of the plurality of converters includes the rectifier unit 111, the first boost module 112, the start circuit 113, the second boost module 114, the second control unit 114a, the voltage conversion circuit 114b, the first switch 115, the control unit 116 and the transformer winding 117.

Figure 3:
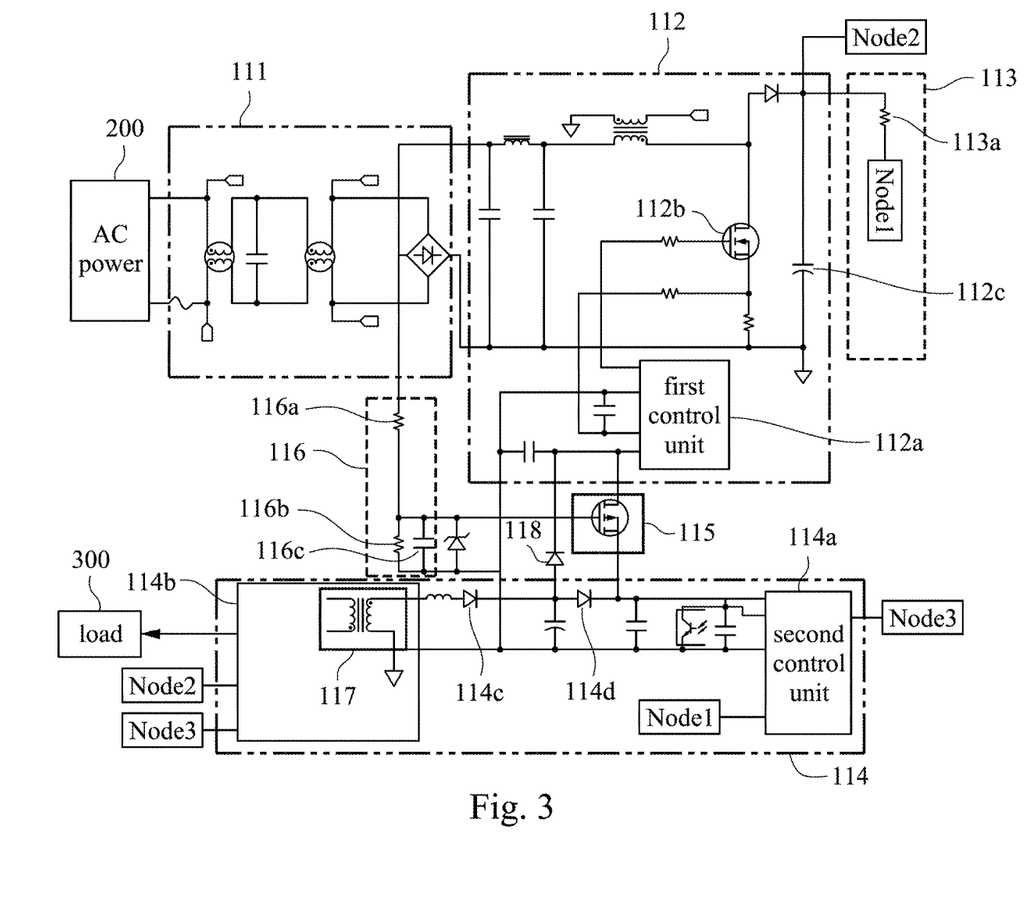
FIG. 3 is a circuit diagram of a power converter according to an embodiment of the present disclosure.

FIG. 3 shows a circuit diagram according to one of the power converters 110 in the power supply system 100 shown in FIG. 2 of the present disclosure. As shown in FIG. 3, the rectifier unit 111 may be any rectifier with the function for converting alternating current (AC) power 200 into direct current (DC) power, such as half-wave rectifier, full-wave rectifier, half-bridge rectifier, full-bridge rectifier, or other related combinations of rectifiers. The rectifier unit 111 converts the input of the AC power 200 to generate a first voltage V1. After the first voltage V1 generated by the rectifier unit 111 passing through the first boost module 112, may charge the first energy storage component 112c.

In general application, as shown in FIG. 3, the first energy storage component 112c and second energy storage component 116c may be the component or module with charge and discharge function. The present disclosure uses capacitors as examples, but not limited thereto.

In some of embodiments, as shown in FIG. 3, the control unit 116 is coupled to the rectifier unit 111. The control unit 116 receives the first voltage V1 outputted by the rectifier unit 111 for a period of time, controlling the first switch 115 to selectivity turn on or turn off according to the first voltage V1.

Reference is made to FIG. 3. The control unit 116 includes the delay circuit. The delay circuit in the control unit 116 is constructed by the first resistor 116a, the second resistor 116b and the second energy storage component 116c. The first terminal of the first resistor 116a is coupled to the rectifier unit 111 and receives the first voltage V1. The first terminal of the second resistor 116b is coupled to the second terminal of the first resistor 116a. The first terminal of the second energy storage component 116c is coupled to the first terminal of the second resistor 116b. The second terminal of the second energy storage component 116c is coupled to the second terminal of the second resistor 116b. On the condition that the first resistor 116a receives the first voltage V1 and charges the second energy storage component 116c. On the condition that the first resistor 116a receives the first voltage V1 for a predetermined time, the first terminal of the second energy storage component 116c is charged from low potential to high potential, such that the gate of the first switch 115 is high potential.

In general application, the first switch 115 may be power semiconductor such as metal oxide semiconductor field effect transistor (MOSFET) or bipolar junction transistors (BJT). The present disclosure uses MOSFET as an example, but not limited thereto.

Reference is made to FIG. 3. The gate of the first switch 115 is coupled to the control unit 116. The source of the first switch 115 is coupled to the transformer winding 117. In this embodiment, the first switch 115 may be P type power semiconductor (e.g. P type MOSFET), that is, the switching component with low voltage conduction, but not limited thereto. On the condition that the gate voltage of the first switch 115 is lower than a threshold voltage (Vth), the first switch 115 is turned on. On the contrary, on the condition that the gate voltage of the first switch 115 is greater than the threshold voltage (Vth), the first switch 115 is turn off.

Reference is made to FIG. 2 and FIG. 3. The first boost module 112 is coupled to the rectifier unit 111. The first boost module 112 includes the first control unit 112a, the second switch 112b and the first energy storage component 112c. If the first control unit 112a is activated, the first control unit 112a may control the second switch 112b to switch the switching state of the second switch 112b, such that the first boost module 112 outputs the first conversion voltage U1.

Figure 4:
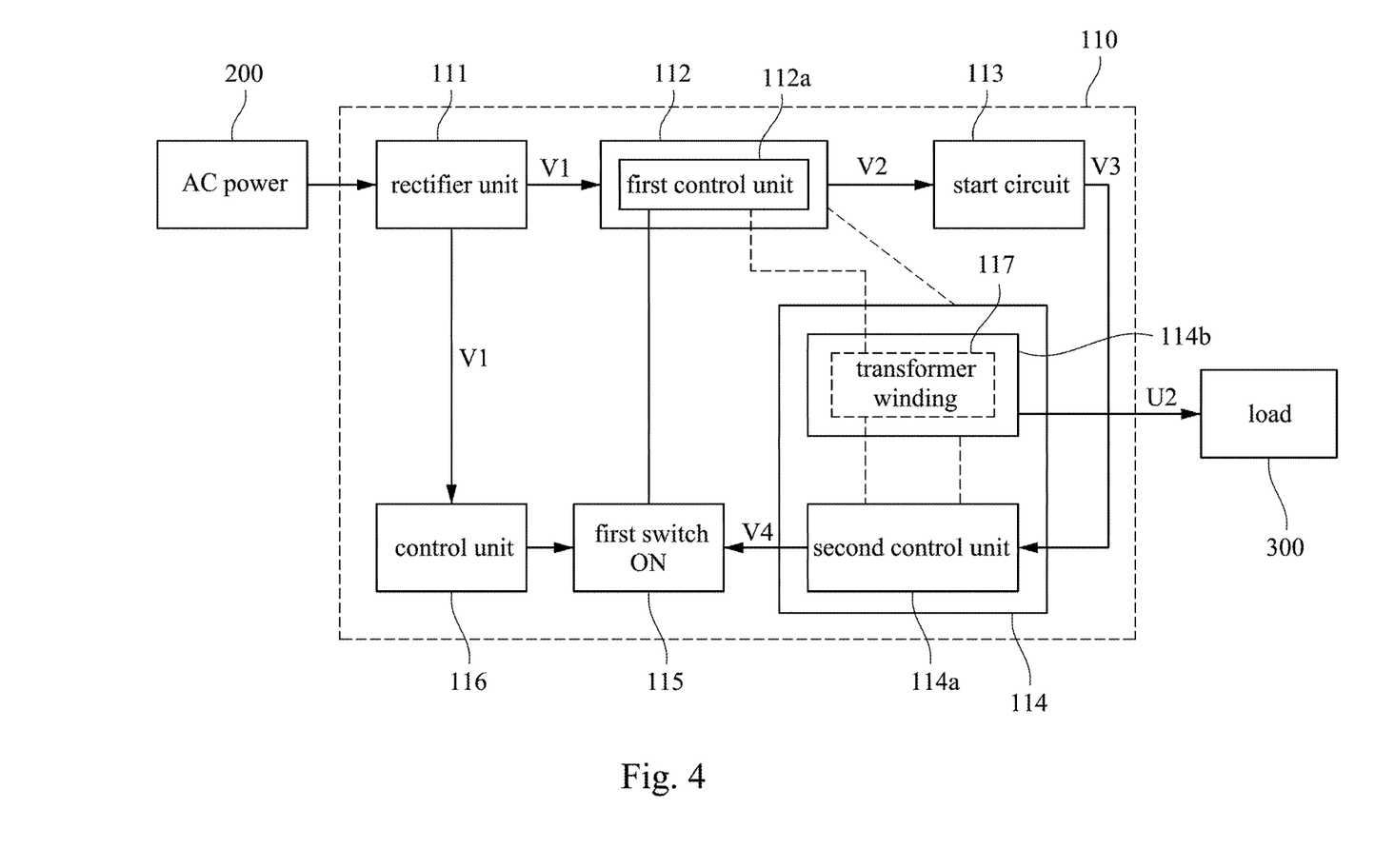
FIG. 4 is a diagram of the startup path of a power converter according to an embodiment of the present disclosure.

On the contrary, if the first control unit 112a is not activated, the first control unit 112a does not switch the switching state of the second switch 112b, at this time, the first boost module 112 will not generate the first conversion voltage U1. Please refer to FIG. 4. FIG. 4 is a diagram of the startup path of the power converter 110 according to FIG. 3 in the present disclosure. As shown in FIG. 3 and FIG. 4, on the condition that in the process of the power converter 110 is activated, at the initial state, the first control unit 112a has not been started yet, therefore, the first control unit 112a does not switch the switching state of the second switch 112b. After the first boost module 112 filters the first voltage V1 of the rectifier unit 111, the first energy storage component 112c charged by the first voltage V1, and the first energy storage component 112c generates the second voltage V2. The second voltage V2 generated by the first boost module 112 is output to the start circuit 113.

As shown in FIG. 3 and FIG. 4, the start circuit 113 includes the starting resistor 113a. The first energy storage component 112c is coupled to the starting resistor 113a.

After the first energy storage component 112c is charged for a period of time, the first energy storage component 112c provides the third voltage V3 via the starting resistor 113a to the second boost module 114.

As shown in FIG. 3 and FIG. 4, the second boost module 114 is electrically coupled to the start circuit 113, the second boost module 114 includes the second control unit 114a, the voltage conversion circuit 114b, the first unidirectional isolating component 114c and the second unidirectional isolating component 114d. The second control unit 114a generates the fourth voltage V4 according to the third voltage V3. As shown in FIG. 3, because the starting resistor 113a is coupled to the second control unit 114a in the second boost module 114, therefore the second control unit 114a is used to receive the third voltage V3. As shown in FIG. 4, on the condition that the third voltage V3 actives the second control unit 114a, the second control unit 114a transmit the fourth V4 to the first switch 115.

As shown in FIG. 2 and FIG. 3, the first switch 115 is electrically coupled between the first boost module 112 and the second boost module 114, and selectively conducting the fourth voltage V4 provided by the second boost module 114 to the first boost module 112. The first switch 115 is selectively turned on or turned off, such that the fourth voltage V4 is transmitted or not.

As shown in FIG. 3, before the second boost module 114 is activated, the gate voltage of the first switch 115 is coupled to the ground via the second resistor 116b and the second energy storage component 116c, and the second energy storage component 116c has not been charged to high potential, therefore the gate voltage of first switch 115 is lower than the threshold voltage Vth, thus the first switch 115 is turned on.

On the condition that the second control unit 114a just activated and outputs the fourth voltage V4, because the second energy storage component 116c does not charged to high potential, the first switch 115 is turned on. As shown in FIG. 4, on the condition that the first switch 115 is turned on, the first switch 115 outputs the fourth voltage to the first boost module 112 according to the second control unit 114a.

As shown in FIG. 2 and FIG. 3, because the first control unit 112a in the first boost module 112 is coupled to the first switch 115, after the first control unit 112a receives the fourth voltage V4 via the first switch 115, the first control unit 112a is activated. The first control unit 112a starts controlling the second switch 112b such that the first boost module 112 outputs the first conversion voltage U1.

Figure 5:
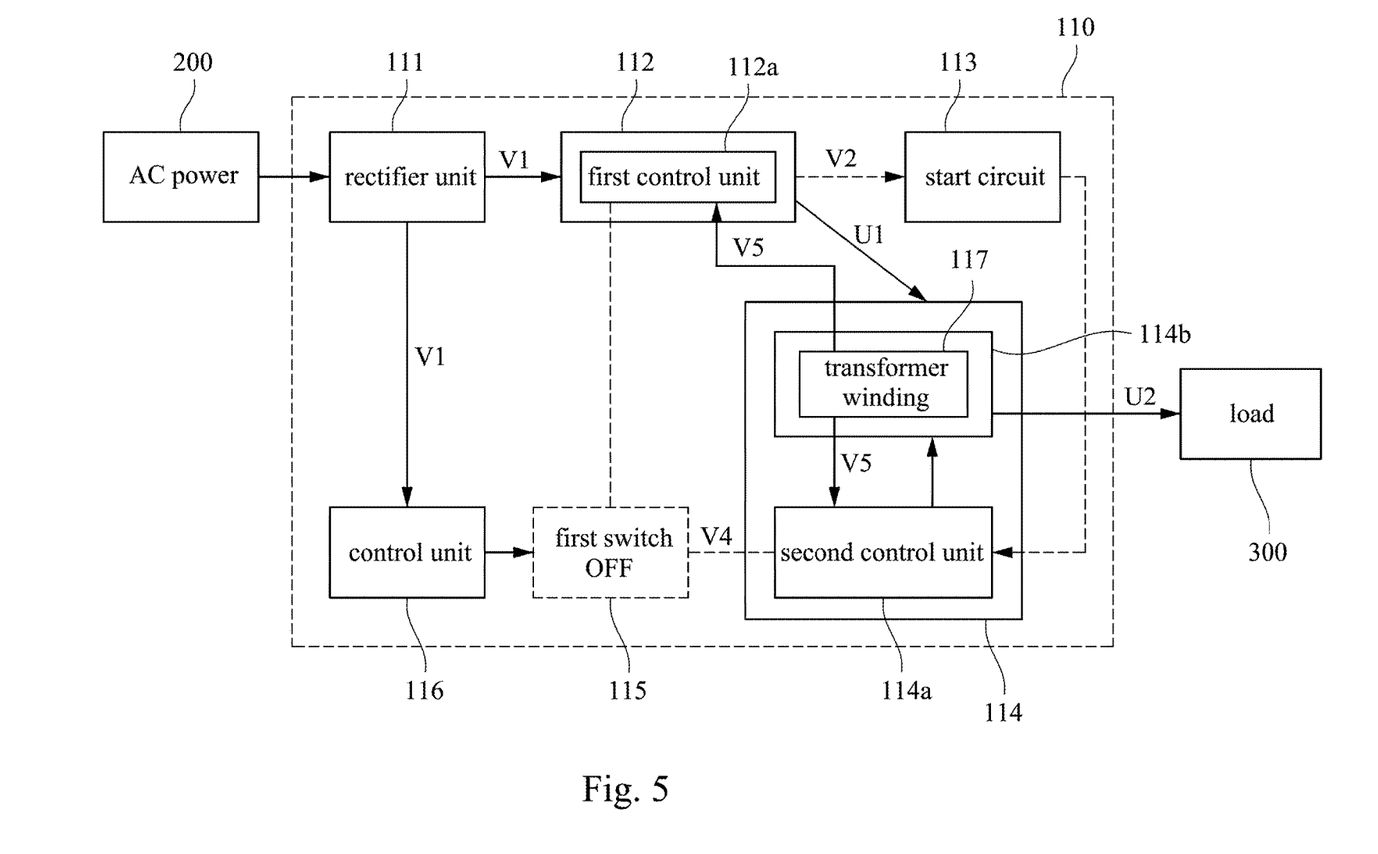
FIG. 5 is a diagram of the path of the power converter after activated according to an embodiment of the present disclosure.

FIG. 5 is a diagram of the path of the power converter 110 depicted in FIG. 3 after activated according to an embodiment of the present disclosure. Please refer to FIG. 3 and FIG. 5. On the condition that the first boost module 112 outputs the first conversion voltage U1 to the second boost module 114, the transformer winding 117 generates the fifth voltage V5.

As shown in FIG. 3 and FIG. 5, on the condition that the transformer winding 117 generates the fifth voltage V5, the first resistor 116a in the control unit 116 receives the first voltage V1 and charges the second energy storage component 116c for a predetermined time, the second energy storage component 116c is charged to high potential, such that the gate voltage of the first switch 115 is greater than the threshold voltage Vth, therefore the first switch 115 is turned off. At this time, the second control unit 114a can't transmit the fourth voltage V4 to the first boost module 112 via the first switch 115.

In the present disclosure, the voltage conversion circuit 114b includes the transformer winding 117 by examples, but the present disclosure is not limited thereto. In addition, the transformer winding 117 in the present disclosure may be an isolated transformer or other transformers with windings As shown in FIG. 3, the second boost module 114 further includes the first unidirectional isolating component 114c and the second unidirectional isolating component 114d. The first unidirectional isolating component 114c is electrically coupled to the transformer winding 117 and the first control unit 112a. The second unidirectional isolating component 114d is electrically coupled to the transformer winding 117 and the second control unit 114a. The first unidirectional isolating component 114c and the second unidirectional isolating component 114d are configured to prevent the current from flowing back to the transformer winding. Since the current does not flow back to the transformer winding 117 and the first switch 115 is off, the second control unit 114a is completely isolated from the first control unit 112a, and the fourth voltage V4 is also unable to be transmitted from the second control unit 114a to the first control unit 112a via the loop of the transformer winding 117 or the first switch 115.

As shown in FIG. 3 and FIG. 5, on the condition that the first switch 115 is turned off, the transformer winding 117 transmits the fifth voltage V5 to the first control unit 112a via the first unidirectional isolating component 114c and the third unidirectional isolating component 118. The fifth voltage V5 replaces the fourth voltage V4 in order to maintain the first control unit 112a being activated, such that the first boost module 112 continuously outputs the first conversion voltage U1.

As shown in FIG. 3 and FIG. 5, the transformer winding 117 transmits the fifth voltage V5 to the second control unit 114a via the first unidirectional isolating component 114c and the second unidirectional isolating component 114d. The second control unit 114a is activated according to the fifth voltage V5, and on the condition that the second control unit 114a is activated, the second control unit 114a starts to control the voltage conversion circuit 114b, such that the second boost module 114 outputs the second conversion voltage U2 to the load 300.

As shown in FIG. 3 and FIG. 5, on the condition that the fifth voltage V5 outputted by the transformer winding 117 supplies power to the first control unit 112a and the second control unit 114a at the same time, the starting resistor 113a stops supplying power to the second control unit 114a.

As shown in FIG. 1, on the condition that the output voltage of one of the power converters 110 is abnormal, since the terminal voltage of the load 300 is greater than the output voltage of the power converters 110, the load 300 recharges voltage inversely to the internal of the power converters 110 via the output terminal of the power converters 110.

Figure 6:
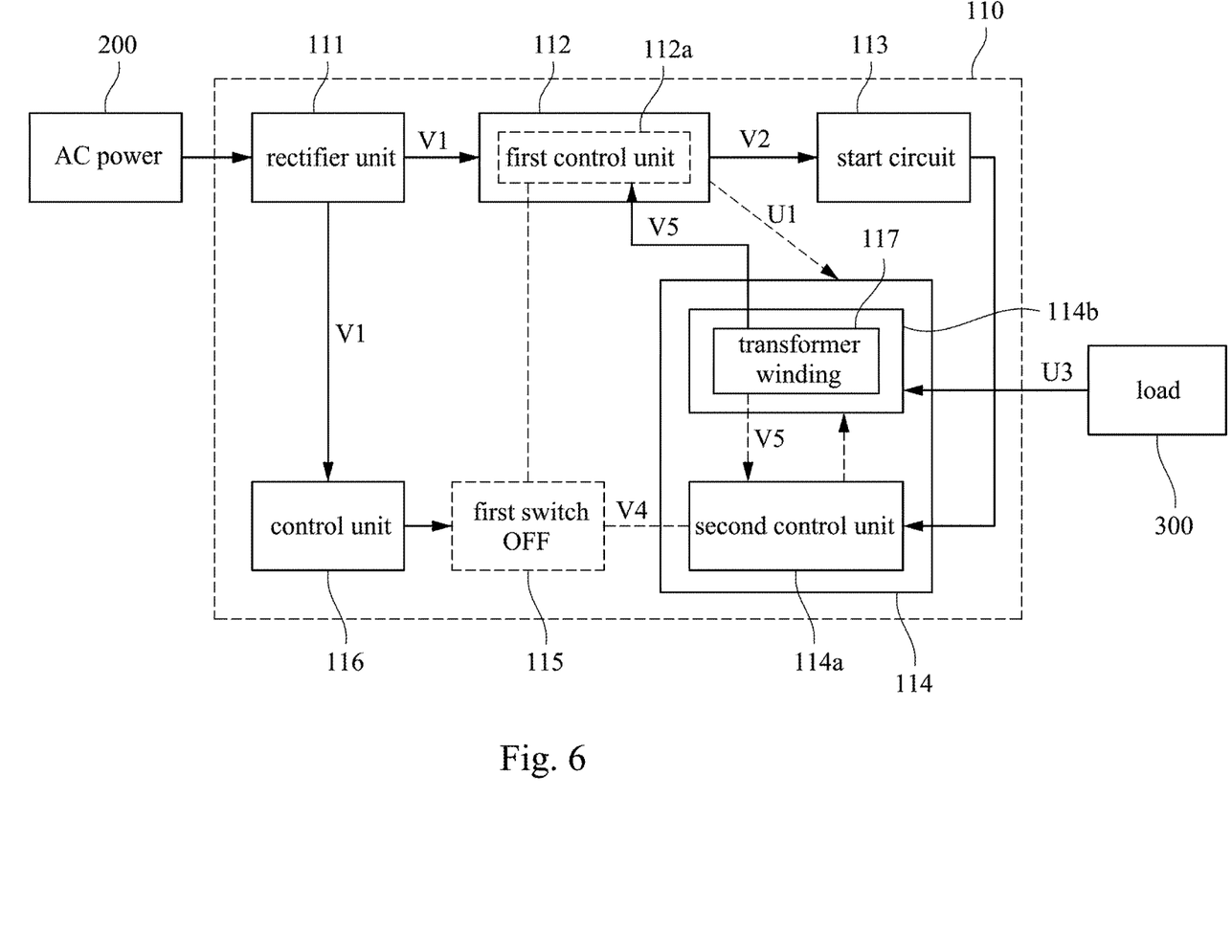
FIG. 6 is a diagram of the protection path for the abnormal output of the voltage converter according to an embodiment of the present disclosure.

FIG. 6 is a diagram of the protection path for the abnormal output of the power converter 110 depicted in FIG. 3 according to an embodiment of the present disclosure. Please refer to FIG. 3 and FIG. 6. On the condition that the output of the power converter 110 is abnormal, the fifth voltage V5 of the transformer winding 117 rises instantly due to the reverse voltage U3 from the load 300. The first control unit 112a will shut down as being unable to bear the fifth voltage V5 raised by the reverse voltage U3.

As shown in FIG. 6, on the condition that the first control unit 112a is turned off, the first control unit 112a also stops controlling the second switch 112b. Thus, the first boost module 112 stops outputting the first conversion voltage U1. Therefore, the first conversion voltage U1 gradually decreases.

As shown in FIG. 6, on the condition that the first conversion voltage U1 gradually decreases, the voltage conversion circuit 114b in the second boost module 114 is cut-off and gradually stops outputting the second conversion voltage U2. At this time, the reverse voltage U3 is not inputted from the output terminal of the power converter 110, and the second conversion voltage U2 decreases continuously; therefore, the fifth voltage V5 of the output of the transformer winding 117 starts to decrease gradually until the fifth voltage V5 of the transformer winding 117 is insufficient to activate the second control unit 114a.

As shown in FIG. 3 and FIG. 6, on the condition that the fifth voltage V5 of the transformer winding 117 is insufficient to activate the second control unit 114a, the second control unit 114a starts to extract power from the first energy storage component 112c via the starting resistor 113a.

As shown in FIG. 3 and FIG. 6, on the condition that the second control unit 114a starts to extract power via the starting resistor 113a, the second control unit 114a gradually stops controlling the voltage conversion circuit 114b, such that the fifth voltage V5 outputted by the transformer winding 117 in the voltage conversion circuit 114b decreases continuously.

As shown in FIG. 3 and FIG. 6, in the process of the fifth voltage V5 of the transformer winding 117 decreasing, since the second energy storage component 116c has not discharged to the ground via the second resistor 116b, the gate voltage of the first switch 115 is greater than the threshold voltage Vth, and therefore the first switch 115 is still cut-off. The second control unit 114a is still completely isolated from the first control unit 112a, and the fourth voltage V4 is unable to be transmitted from the second control unit 114a to the first control unit 112a.

In summary, on the condition that the first switch 115 still remains in the cut-off state, it can be prevented that the second control unit 114a extracts power from the first energy storage component 112c via the starting resistor 113a continuously, since the second control unit 114a is unable to supply the fourth voltage V4 to the first control unit 112a. The starting resistor 113a does not endure the high voltage either. Therefore, on the condition that the output of the power converter 110 is abnormal resulting the reverse voltage U3 of the load 300 occurs, the starting resistor 113a is prevented from enduring high voltage and burning.

On the condition that the AC power 200 stops supplying power and the first voltage V1 outputted by the rectifier unit 111 decreases to zero, since the second energy storage component 116c discharges continuously to the ground via the second resistor 116b to a low potential level, the gate voltage of the first switch 115 is lower than the threshold voltage Vth, such that the first switch 115 is turned on again. The second control unit 114a may transmit the fourth voltage V4 to the first control unit 112a via the first switch 115. At this time, referring to FIG. 4, the power converter 110 re-executes the startup process as described above.

In addition, in the event of no conflict, the diagrams, embodiments, and the features and circuits in the embodiments of the present disclosure may be combined with each other. The circuit shown in the drawings is for illustrative purposes and is simplified for simplifying the description and facilitates understanding, and is not intended to limit the present disclosure.

In addition, those skilled in the art understand that in various embodiments, each circuit unit may be implemented by various types of digital or analog circuits, and may also be implemented by different integrated circuit chips. Each component can also be integrated into a single integrated circuit chip. The above is only illustrative, and the disclosure is not limited thereto. Electronic components such as resistors, capacitors, diodes, optocouplers, etc., can be made of various suitable devices. For example, the diodes can be selected according to requirements or other various types of transistors.

Although the present disclosure has been described in considerable detail with reference to certain embodiments thereof, other embodiments are possible and the present disclosure is not limited thereto. It will be apparent to those skilled in the art that various modifications and variations can be made to the structure of the present invention without departing from the scope or spirit of the disclosure. In view of the foregoing, it is intended that the present disclosure cover modifications and variations of this disclosure provided they fall within the scope of the following claims.

What is claimed is:

1. A power supply system, comprising:
  a plurality of power converters, wherein output terminals of the plurality of power converters are electrically coupled to each other, and any one of the plurality of converters comprises:
  a rectifier unit, configured to generate a first voltage;
  a first boost module, electrically coupled to the rectifier unit and configured to generate a second voltage according to the first voltage;
  a start circuit, electrically coupled to the first boost module, and configured to provide a third voltage according to the second voltage;
  a second boost module, electrically coupled to the start circuit, and configured to generate a fourth voltage according to the third voltage;
  a first switch, electrically coupled to the first boost module and the second boost module, and configured to selectively conduct the fourth voltage provided by the second boost module to the first boost module; and
  a control unit, electrically coupled to the rectifier unit, the first boost module and the first switch;
  wherein after the second boost module receives the third voltage, the fourth voltage is delivered via the first switch from the second boost module to the first boost module, on the condition that the control unit receives the first voltage for a predetermined time, the control unit is configured to turn off the first switch and stop outputting the fourth voltage to the first boost module.

2. The power supply system of claim 1, wherein the first boost module comprises: a first control unit, a first energy storage component and a second switch, wherein the first energy storage component is configured to store power and generate the second voltage, the first control unit is configured to be activated according to the fourth voltage, on the condition that the first control unit is activated, the first control unit controls the second switch such that the first boost module outputs a first conversion voltage.

3. The power supply system of claim 2, further comprising:
  a transformer winding, wherein the transformer winding is configured to generate a fifth voltage on the condition that the first boost module outputs the first conversion voltage;
  wherein the second boost module comprises a second control unit, and the second control unit is activated according to the fifth voltage, and the second boost module is configured to output a second conversion voltage on the condition that the second control unit is activated.

4. The power supply system of claim 3, wherein the fifth voltage is outputted to the first control unit on the condition that the transformer winding generates the fifth voltage, and the fifth voltage replaces the fourth voltage to maintain the first control unit being activated, such that the first boost module outputs the first conversion voltage.

5. The power supply system of claim 3, wherein the start circuit comprises a starting resistor, wherein the starting resistor is electrically coupled to the first energy storage component of the first boost module, and the first energy storage component converts the second voltage into the third voltage by the starting resistor and provides the third voltage to the second boost module.

6. The power supply system of claim 5, wherein the second boost module further comprises:
   a first unidirectional isolating component, electrically coupled to the transformer winding and the first control unit; and
   a second unidirectional isolating component, electrically coupled to the transformer winding and the second control unit;
   wherein the first unidirectional isolating component and second unidirectional isolating component are configured to prevent current flowing back to the transformer winding.

7. The power supply system of claim 1, wherein the control unit comprises a delay circuit, and the delay circuit further comprises:
   a first resistor, wherein a first terminal of the first resistor is electrically coupled the rectifier unit to receive the first voltage;
   a second resistor, wherein a first terminal of the second resistor is electrically coupled to a second terminal of the first resistor; and
   a second energy storage component, wherein a first terminal of the second energy storage component is coupled to the first terminal of the second resistor, and a second terminal of the second energy storage component is coupled to a second terminal of the second resistor;
   wherein the first terminal of the second energy storage component is charged to a high potential level to turn off the first switch on the condition that the first resistor receives the first voltage for the predetermined time.

8. A power converter, comprising:
   a rectifier unit, configured to generate a first voltage;
   a first boost module, electrically coupled to the rectifier unit, wherein the first boost module is configured to generate a second voltage according to the first voltage;
   a start circuit, electrically coupled to the first boost module and configured to provide a third voltage according to the second voltage;
   a second boost module, electrically coupled to the start circuit and configured to generate a fourth voltage according to the third voltage;
   a first switch, electrically coupled to the first boost module and the second boost module, and configured to selectively conduct the fourth voltage provided by the second boost module to the first boost module; and
   a control unit, electrically coupled to the rectifier unit, the first boost module and the first switch;
   wherein the second boost module outputs the fourth voltage to the first boost module via the first switch after the second boost module receives the third voltage, and the control unit is configured to turn off the first switch and stop outputting the fourth voltage to the first boost module on the condition that the control unit receives the first voltage for a predetermined time.

9. The power converter of claim 8, wherein the first boost module comprises a first control unit and a second switch, the first control unit is configured to be activated according to the fourth voltage, and the first control unit controls the second switch such that the first boost module outputs a first conversion voltage on the condition that the first control unit is activated.

10. The power converter of claim 9, further comprising:
   a transformer winding, wherein the transformer winding is configured to generate a fifth voltage on the condition that the first boost module outputs the first conversion voltage;
   wherein the second boost module comprises a second control unit, the second control unit is configured to be activated according to the fifth voltage, such that the second boost module outputs a second conversion voltage on the condition that the second control unit is activated, and the fifth voltage is outputted to the first control unit on the condition that the transformer winding generates the fifth voltage, wherein the fifth voltage replaces the fourth voltage to maintain the first control unit being activated, such that the first boost module outputs the first conversion voltage.

* * * * *